(12) United States Patent
Schminkey

(10) Patent No.: US 9,296,446 B2
(45) Date of Patent: Mar. 29, 2016

(54) HUMAN PROPULSION SYSTEM

(71) Applicant: Kevin Alan Schminkey, Grand Rapids, MN (US)

(72) Inventor: Kevin Alan Schminkey, Grand Rapids, MN (US)

(*) Notice: Subject to any disclaimer, the term of this patent is extended or adjusted under 35 U.S.C. 154(b) by 205 days.

(21) Appl. No.: 13/860,619

(22) Filed: Apr. 11, 2013

(65) Prior Publication Data
US 2014/0306423 A1 Oct. 16, 2014

(51) Int. Cl.
*B62M 1/12* (2006.01)
*B62M 1/16* (2006.01)
*B62M 1/36* (2013.01)
*B62M 1/14* (2006.01)

(52) U.S. Cl.
CPC . *B62M 1/36* (2013.01); *B62M 1/16* (2013.01); *B62M 1/12* (2013.01); *B62M 1/14* (2013.01)

(58) Field of Classification Search
CPC ............. B62M 1/12; B62M 1/14; B62M 1/16
USPC ........................ 280/244, 245, 246, 247, 248
See application file for complete search history.

(56) References Cited

U.S. PATENT DOCUMENTS

| | | | | | |
|---|---|---|---|---|---|
| 904,062 | A | * | 11/1908 | Hamill | 280/254 |
| 917,910 | A | * | 4/1909 | Thomas | 280/245 |
| 1,449,643 | A | * | 3/1923 | Wenderhold | 280/1.191 |
| 1,595,857 | A | * | 8/1926 | Coffman | 280/234 |
| 4,601,482 | A | * | 7/1986 | Ferez | 280/265 |
| 4,840,076 | A | * | 6/1989 | Brubaker et al. | 74/143 |
| 4,911,457 | A | * | 3/1990 | Ishikawa | 280/240 |
| 5,007,655 | A | * | 4/1991 | Hanna | 280/250.1 |
| 5,330,218 | A | * | 7/1994 | Escudero | 280/245 |
| 5,383,675 | A | * | 1/1995 | Liebert | 280/266 |
| 5,542,893 | A | * | 8/1996 | Petersen et al. | 482/72 |
| 5,713,590 | A | * | 2/1998 | Clark | 280/247 |
| 6,572,129 | B1 | * | 6/2003 | Bean | 280/234 |
| 7,584,976 | B2 | * | 9/2009 | Bayne et al. | 280/244 |
| 8,118,320 | B2 | * | 2/2012 | Lee | 280/240 |
| 2008/0277896 | A1 | * | 11/2008 | Lee et al. | 280/244 |
| 2011/0298194 | A1 | * | 12/2011 | Sanchez | 280/245 |

* cited by examiner

*Primary Examiner* — Joseph Rocca
*Assistant Examiner* — Marc A Scharich

(57) ABSTRACT

A human-propulsion-system utilizing an arm lever assembly and a pedal assembly to be adapted to or incorporated into other mechanisms including, but not limited to, wheelchairs and vehicles. The arm lever assembly is reciprocated to provide power and rotated left or right to provide a movement for (steering) control. Both the arm lever assembly and the pedal assembly are operatively connected to a converter, utilizing gears and clutches, that receives the reciprocal movements of the arm lever assembly and the rotational movements of the pedal assembly and converts them into a combined unidirectional output configured to be utilized in combination or independently. The arm lever assembly is further telescoping and offers a range of various leverages by changing the length of the force end when extended and retracted.

16 Claims, 22 Drawing Sheets

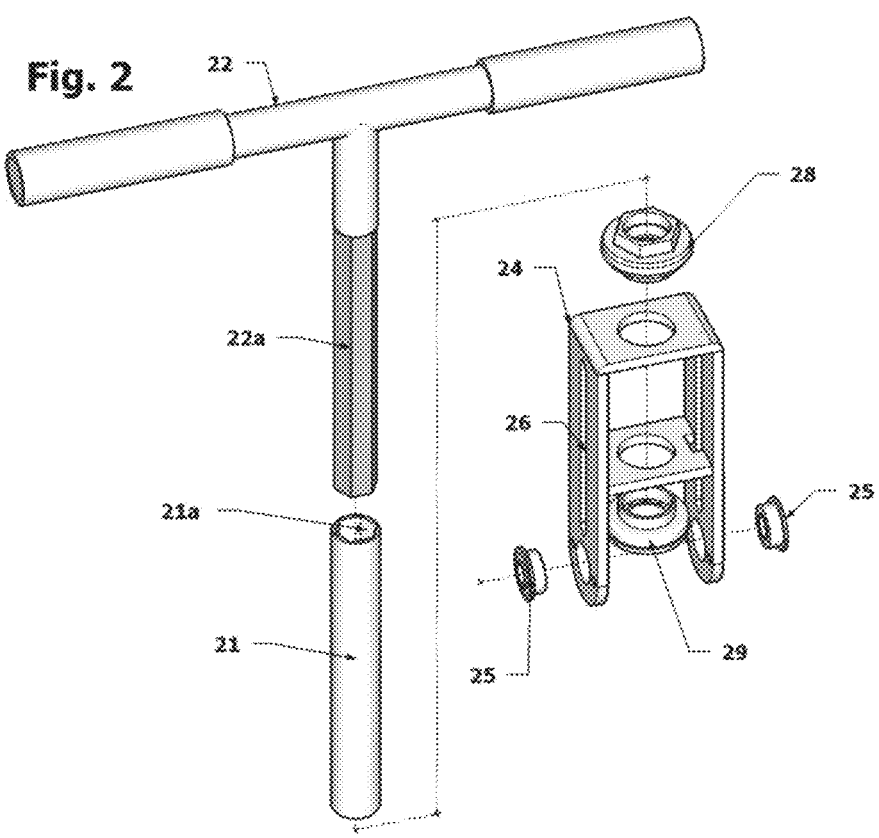

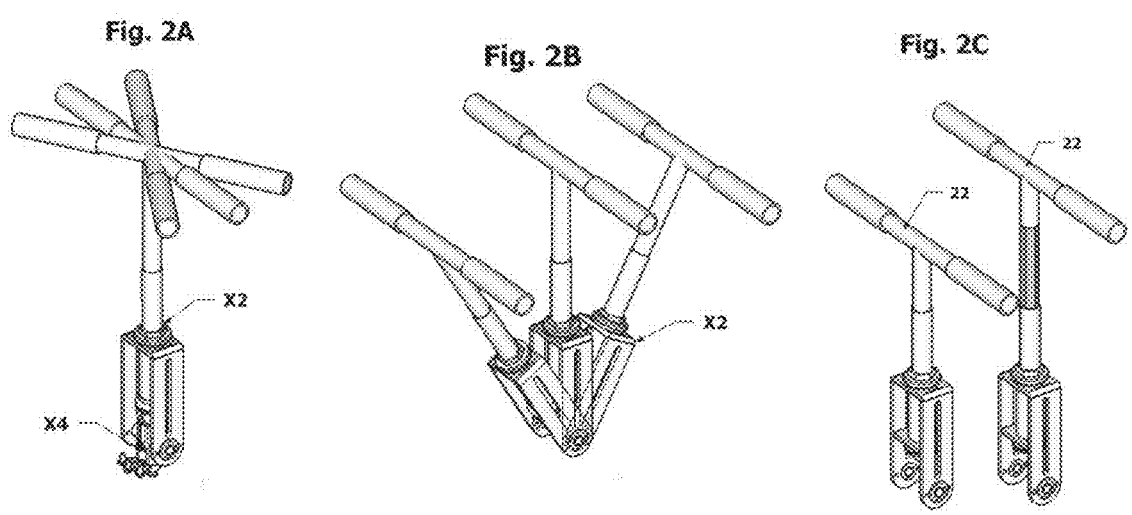

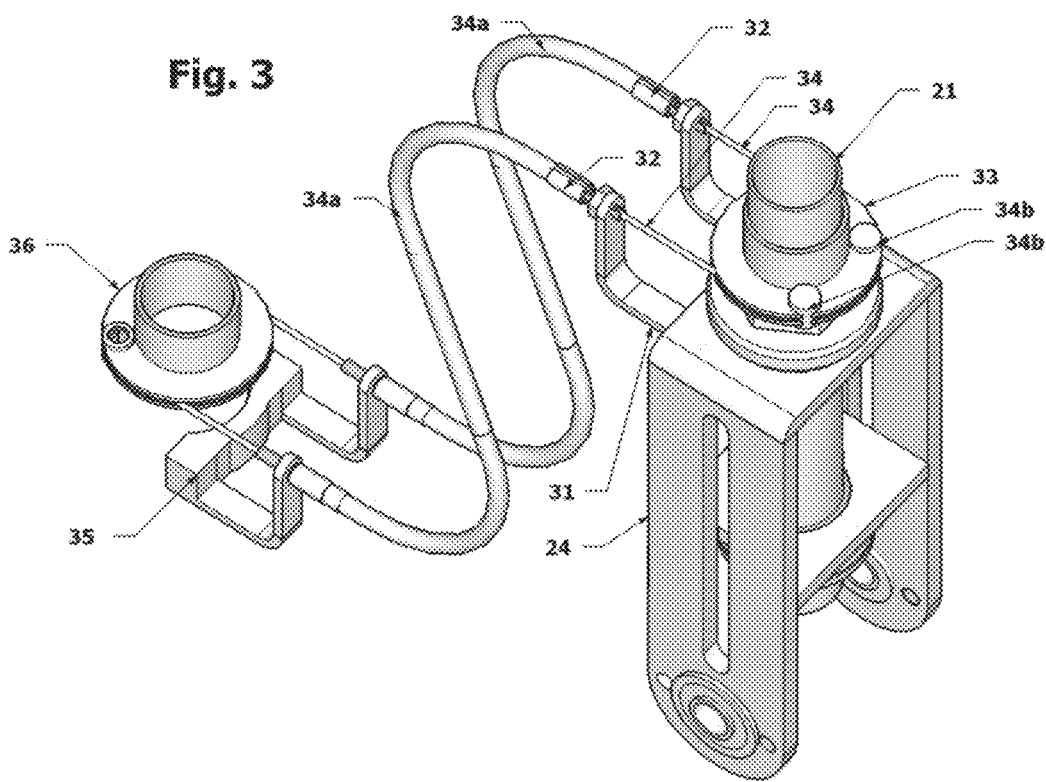

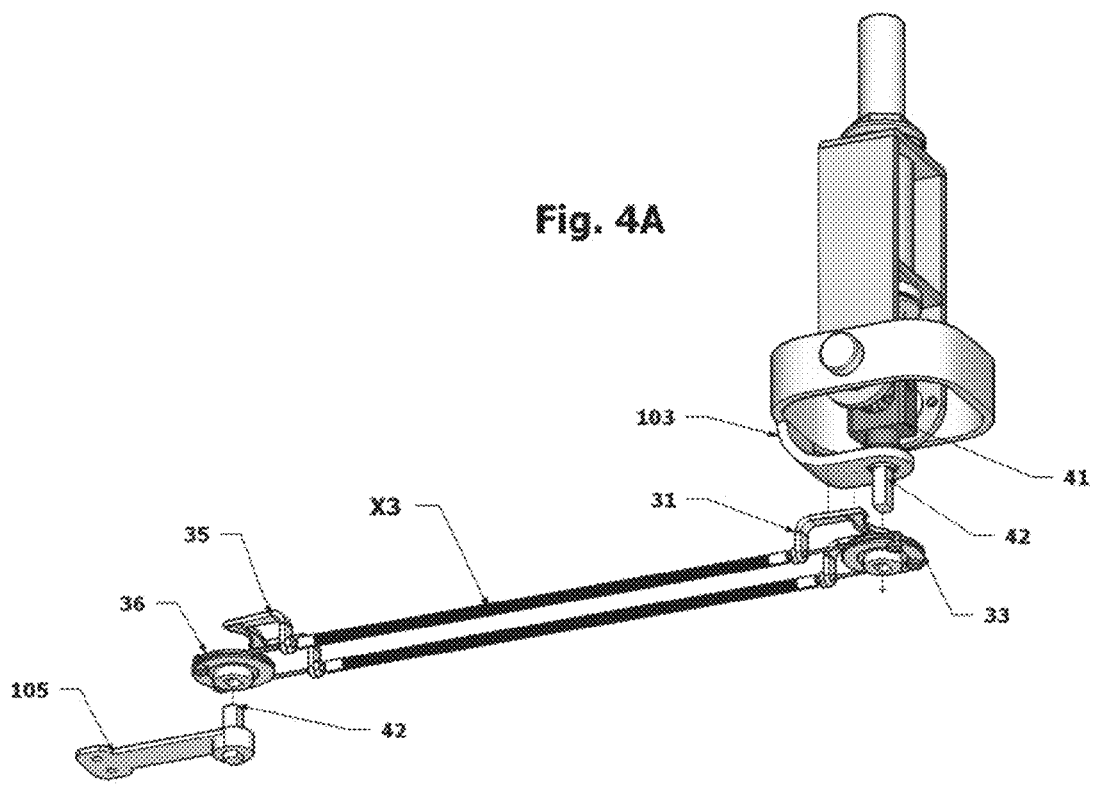

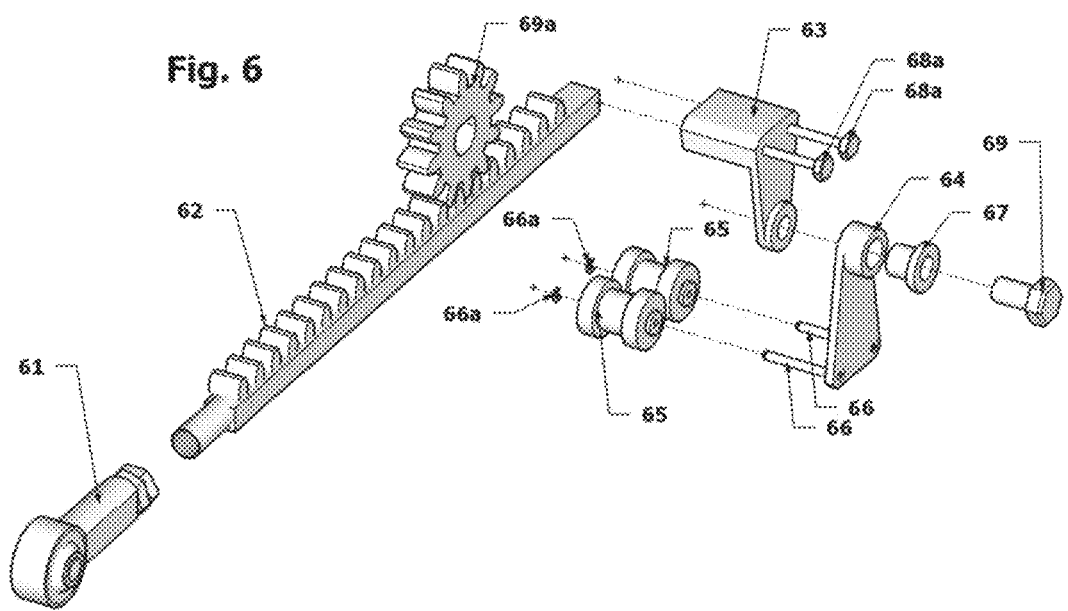

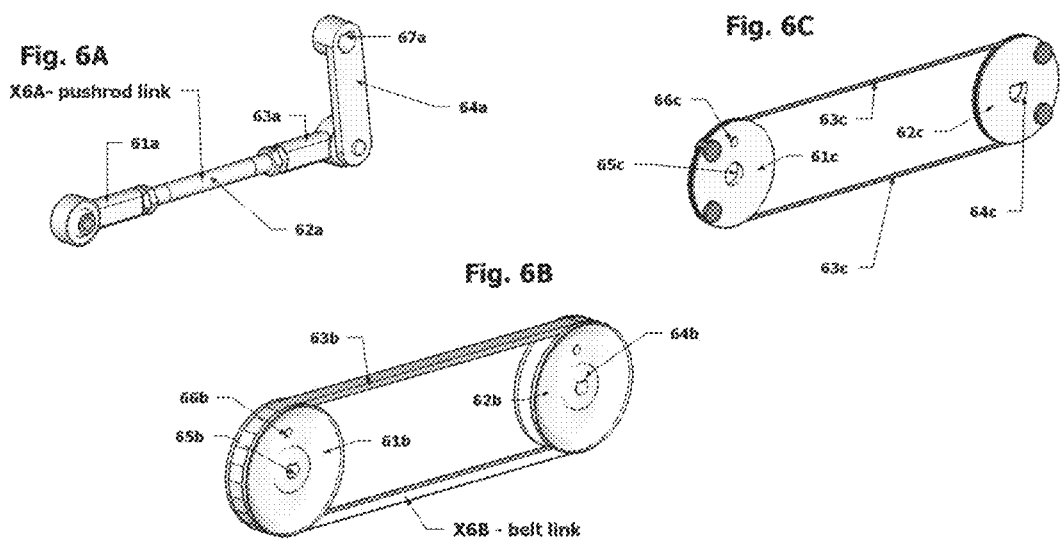

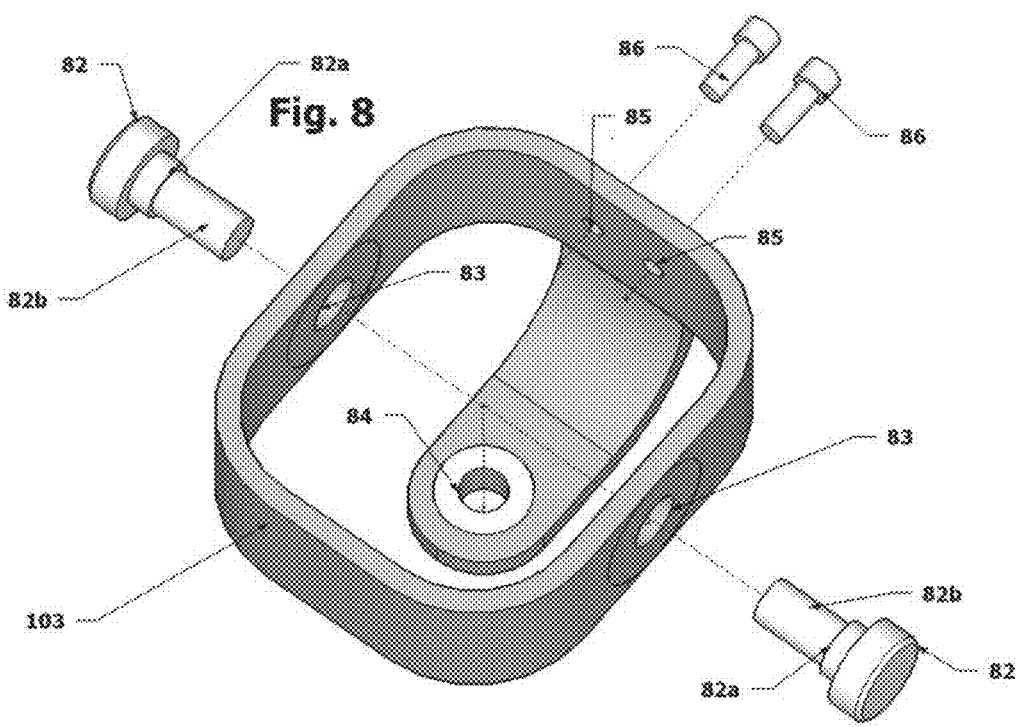

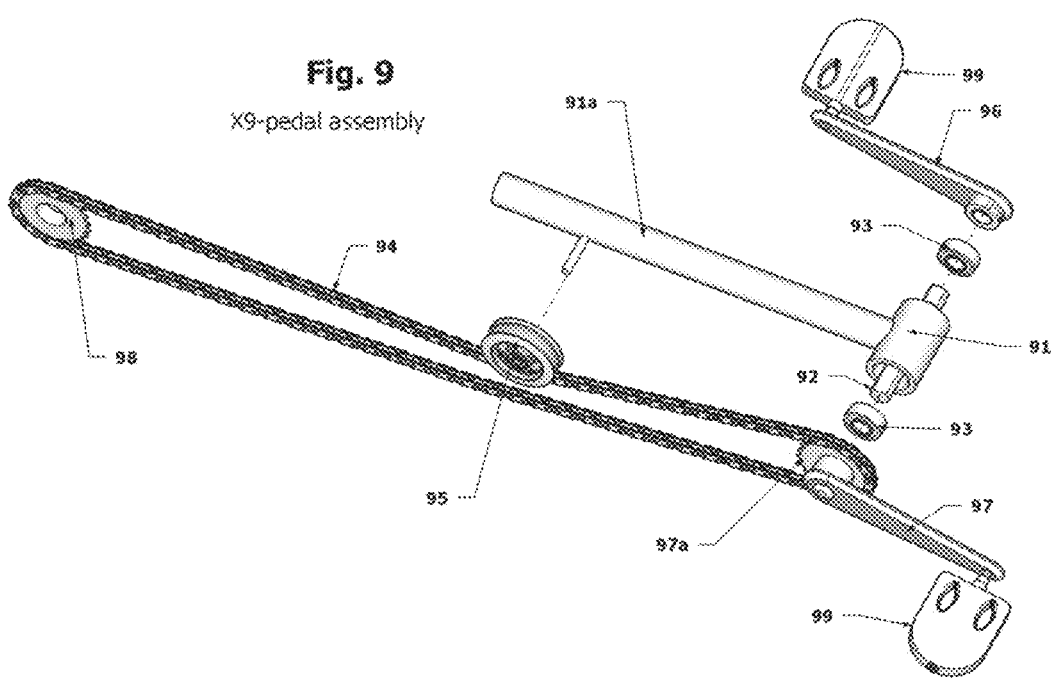

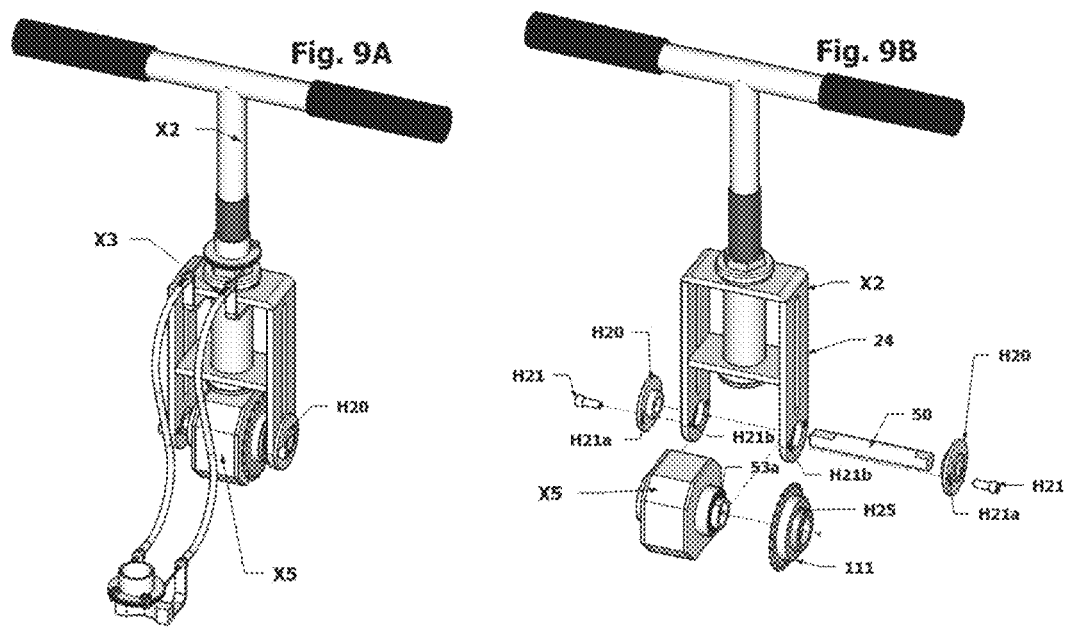

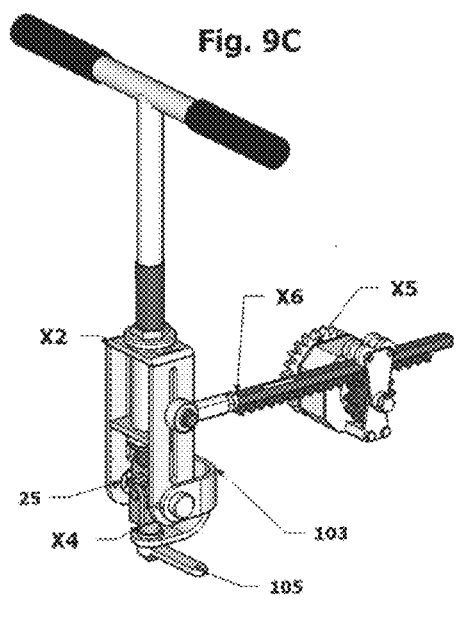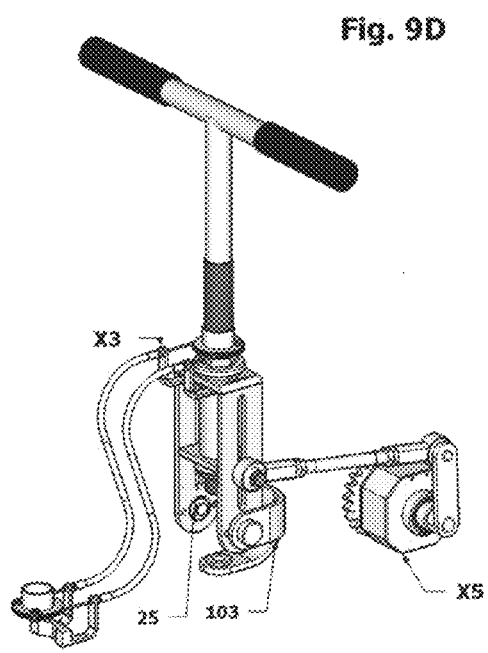

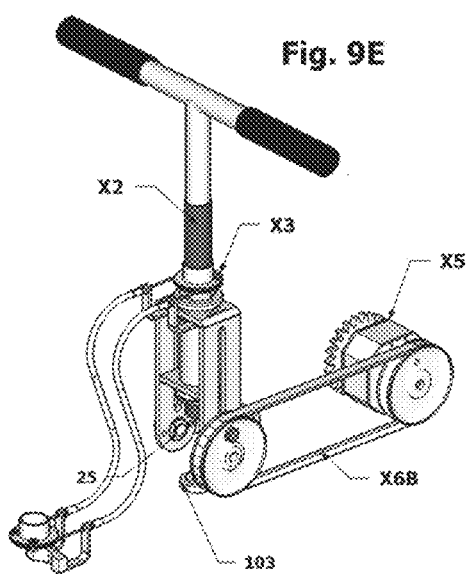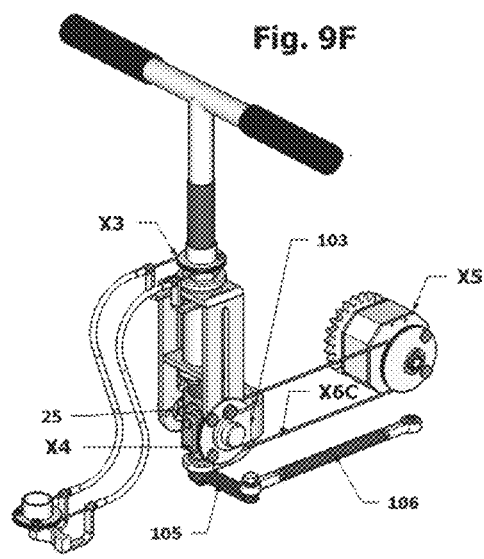

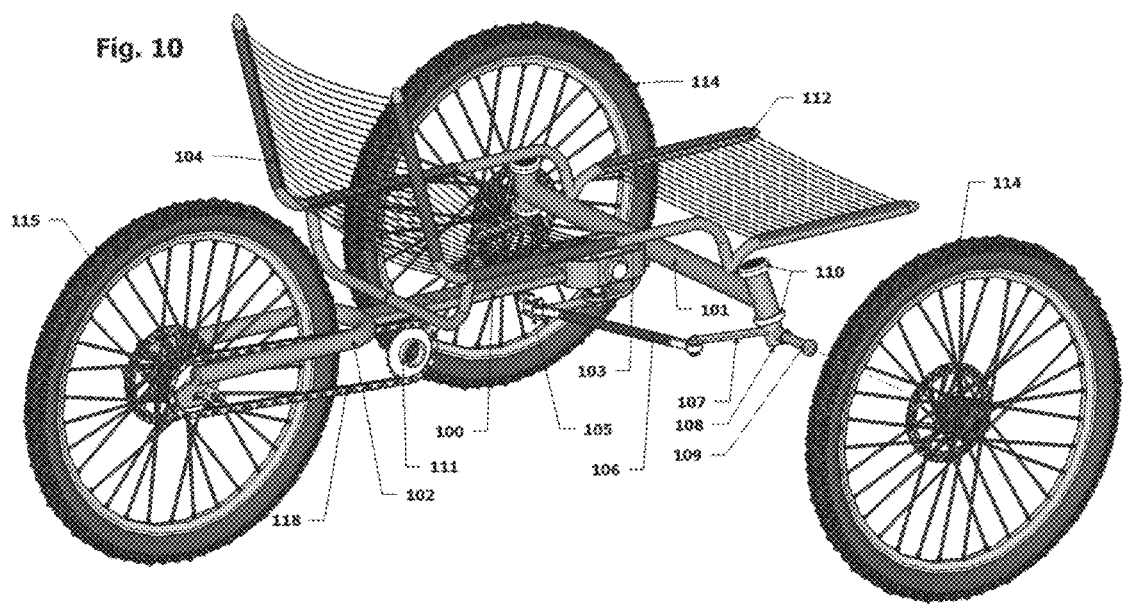

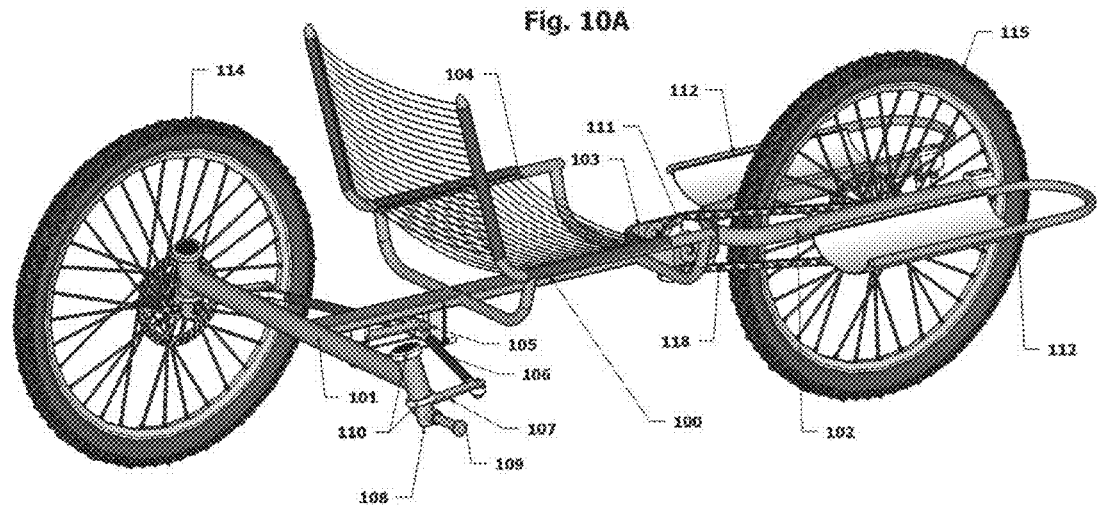

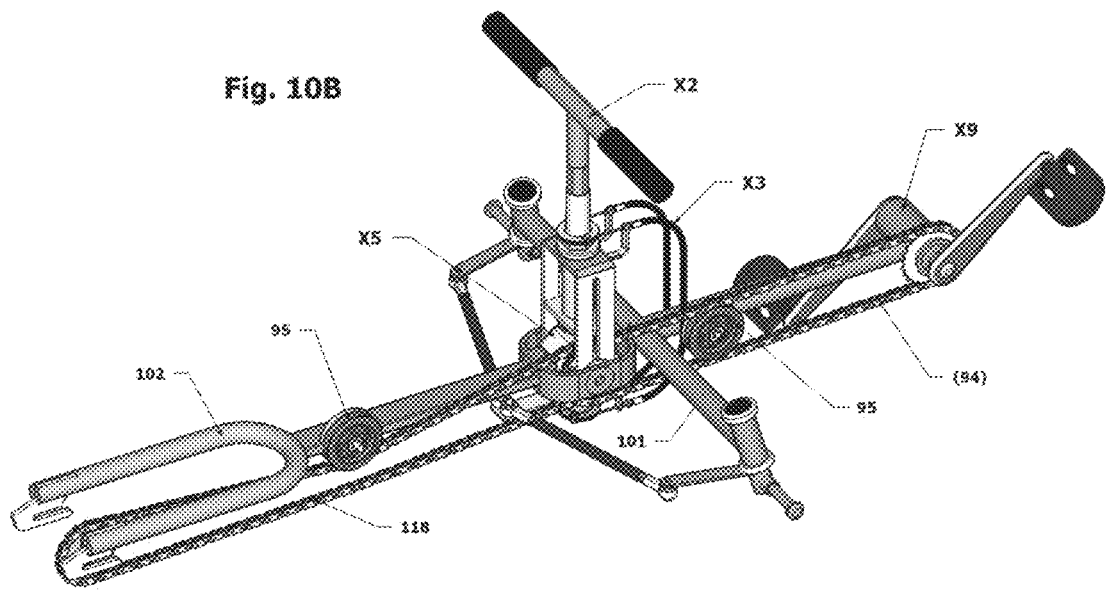

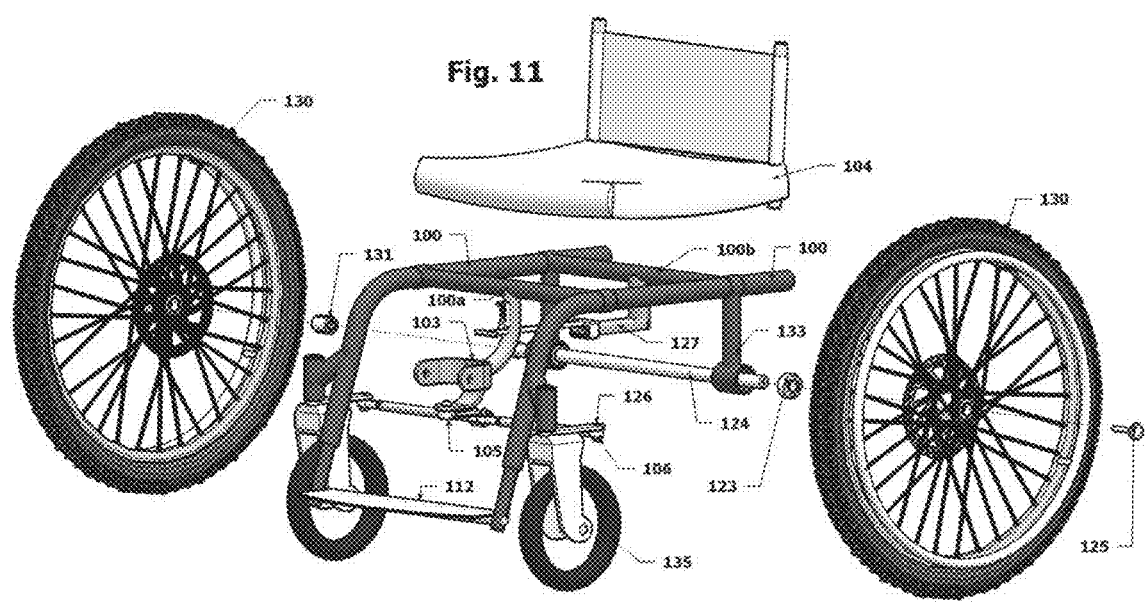

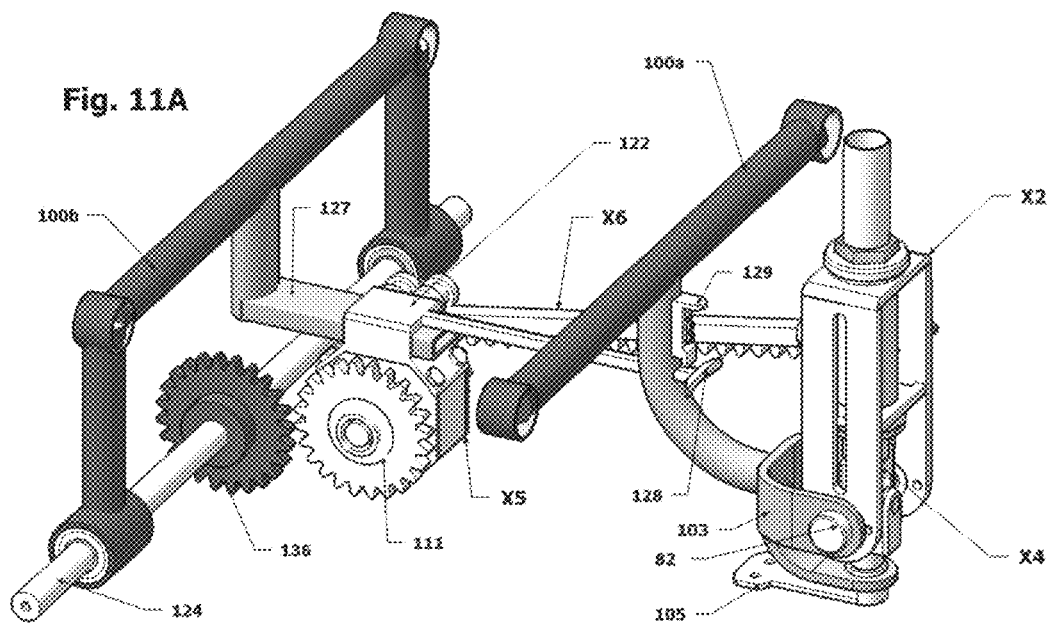

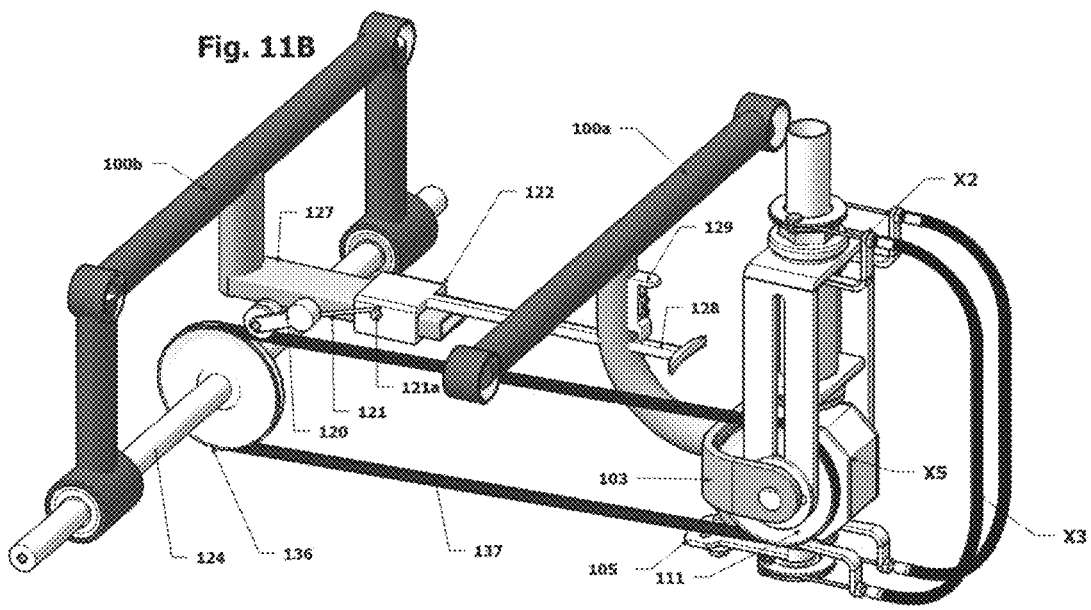

HUMAN PROPULSION SYSTEM

BACKGROUND OF INVENTION

1. Field of invention

The invention relates to human propulsion systems that is configured to be operated by the arms and or legs of an operator to provide a means of powering and controlling other mechanisms including exercise equipment, rehabilitation equipment, wheelchairs and vehicles.

2. Description of Prior Art

The embodiments disclosed enable the making and the using of a human powered vehicle that overcomes the undesirable characteristics of earlier recumbent vehicles.

The unsuitability of such a vehicle for individuals having impaired leg function is apparent. The provisions of the present embodiment to be powered by the operators arms and or legs enables the application of greater motive force and the ability to provide power while resting the operators arms or legs. Further, it is designed to compact and simple and versatile by offering multiple components that can be employed as a whole or alternatively so as to fit many different mechanisms designs.

Earlier vehicles have limited utility compared to the present embodiment. A variety of converter systems have been developed in the past for bicycles, tricycles, hand-cycles in various designs including recumbent style human powered vehicles etc. While most mainly employ only a traditional pedal crank drive commonly found on bicycles there are some that employ levers to be reciprocated for and aft either with ratchet systems that only propels the vehicle in one direction of the lever movement. Others arm lever systems have achieved the ability to propel their vehicle forward in both for and aft reciprocal movements through ratchet mechanisms and clutch and gear systems. There are even some vehicles that are propelled by hand and foot operation.

Liebert in U.S. Pat. No. 5,383,675 combines hand and foot operation in a versatile system that can incorporated into different embodiments that claims to allow an operator to propel on land, water and air. The invention relies on reciprocating movements of both hand and foot that are connected together and helmet to be worn that is linked to steering mechanism that activates by the movement of the operators head. Although very unique in design it has undesired limitation in that the arm and leg levers are linked together and does not allow the operator to use one or the other separately without removing his arms or legs from the corresponding levers further the head activated steering does not allow the operator to be able to look around without altering the path of the vehicle.

Bean in U.S. Pat. No. 6,572,129 combines hand and foot operation in a single embodiment that employs a conventional pedal assembly linked to the two arm lever assemblies by a spring loaded length of chain that wraps around a ratcheting free-wheel sprocket axially supported by the pedal assembly which only adds power on the reverse stroke of hand levers which is limited in means of efficiency. Further, although the pedal assembly can be utilized separate of the arm levers to propel the vehicle the same cannot be the for the arm levers, which activates the pedal assembly when utilized to propel the vehicle.

Bayne in U.S. Pat. No. 7,584,976 is a single lever operated trike design that propels the vehicle forward with both for and aft reciprocal movements of the arm lever. The converter system utilizes a plurality of chains and hubs supporting gears. The steering is activated through a cable system by rotating the arm lever left or right. Although unique in design it lacks in simplicity and compactness in design of the propulsion system and lacks the versatility to be employed into other vehicles and mechanisms, and the ability to incorporate the use of an operators legs.

Schaeffer in U.S. Pat. No. 6,715,780 B2 is human powered wheelchair system that combines at least one arm lever connect to a propulsion system that utilizing gears and clutches to convert the fore and aft movements of the arm lever into a unidirectional rotation linked to a shifting hub to be linked to a driven wheel. Although, it lacks the ability to utilized in anything other than a wheelchair and does not offer a method for steering other than the braking system. Further, it needs to utilize two of the propulsion systems and two gear boxes which can be expensive to produce and cumbersome in design.

BRIEF SUMMARY OF THE INVENTION

The invention disclosed enables the making and the use of a human-propulsion-system that overcomes the undesirable characteristics of earlier propulsion systems.

The human-propulsion-system according to the present disclosure is designed to have sufficient versatility that can be used successfully by many different individuals, each of whom has different needs and capabilities, and can be incorporated for both utilitarian and recreational purposes. It is configured to be operatively utilized by or incorporated into many different mechanisms including rehabilitation apparatuses, exercise equipment, wheelchairs and human powered vehicles but not meant to be limits to these examples.

The human-propulsion-system comprises a telescoping, "T"shaped, arm lever assembly that is reciprocated and pivoted right and left by an operator. The arm lever assembly is reciprocated for a means of propulsion and is operatively connected to a converter that receives the reciprocating movements and converts then into a unidirectional rotation of an output wheel to be operatively linked to propel the different mechanisms.

The invention is designed to be versatile and offers a variety of options wherein; there are two versions of a controller configured to be utilized by the arm lever assembly for corresponding with the right and left rotational movements of the arm lever, providing the operator with a means of control of a function of the different mechanisms like steering. The arm lever assembly can be directly connected to the converter at the fulcrum point or linked to the converter, by a variety of links, a distance from the fulcrum point. Further, the telescoping movements of the arm lever can offer a range of leverages by increasing and decreasing the length of the arm lever.

There is also an optional foot pedal assembly that can be rigidly attached to front of the support mechanism and operatively linked to the converter to offer the operator the ability to add leg power to the human-propulsion-system.

Additional objects, advantages, and other novel features of the invention will be set forth in the detailed description that follows with reference to the accompanying drawings, and will become apparent to those skilled in the art upon examination of the following, or will be learned with the practice of the invention. The objects and advantages may be realized and obtained by means of the instrumentalities and combinations particularly pointed out in the appending claims.

BRIEF DESCRIPTION OF THE DRAWINGS

FIG. 2 is an isometric view of the arm lever assembly (X2) exploded.

FIG. 2A is an isometric view demonstrating the rotational movements of the arm lever assembly (X2).

FIG. 2B is an isometric view demonstrating the reciprocal movements of the arm lever assembly (X2).

FIG. 2C is an isometric view demonstrating the extending and retracting movements of the arm lever assembly (X2).

FIG. 3 is an isometric view of the cable controller (X3) supported by the corresponding components of the arm lever assembly (X2).

FIG. 4A is an isometric view of the cable controller (X3) and u-joint controller (X4) combined.

FIG. 6 is an isometric view of the rack link (X6) exploded.

FIG. 6A is an isometric view of the pushrod link (X6A).

FIG. 6B is an isometric view of the belt link (X6B).

FIG. 6C is an isometric view of cable link (X6C).

FIG. 8 is an isometric view of the pivot support (X8) exploded.

FIG. 9 is an isometric view of the pedal assembly (X9) exploded.

FIG. 9A is an isometric view of arm lever assembly (X2) connected directly to the converter (X5).

FIG. 9B is an isometric view of FIG. 9A exploded.

FIG. 9C is an isometric view of the human-propulsion-system combining X2, X4, X5, and X6.

FIG. 9D is an isometric view of the human-propulsion-system combining X2, X3, X5, and X6A.

FIG. 9E is an isometric view of the human-propulsion-system combining X2, X3, X5, and X6B.

FIG. 9F is an isometric view of the human-propulsion-system combining X2, X3, X4, X5, and X6C.

FIG. 11 is an isometric view of the wheelchair support exploded.

FIG. 11A is an isometric view of certain parts of the wheelchair support utilizing the arm lever assembly (X2) separated from the converter (X5).

FIG. 11B is an isometric view of certain parts of the wheelchair support utilizing the arm lever assembly (X2) linked directly to the converter (X5).

DETAILED DESCRIPTION OF THE INVENTION

Reference will now be made to the preferred embodiment of the invention, the example of which is illustrated in the accompanying drawings. As required, detailed embodiments of the invention are disclosed herein; however, details to the function, shape, dimensions, materials, methods of fastening, methods of attaching, and structures of the components of the invention are not meant to be interpreted as limiting, but rather a basis for the claims of the invention and to educate one skilled in the art to employ the invention in virtually any structure. Further there is illustrated certain shapes and cuts on the O.D. and I.D. of corresponding components, like "D" cuts, but any shape or cut can be used as long as it unifies the rotational movements of the components.

Figure 1:
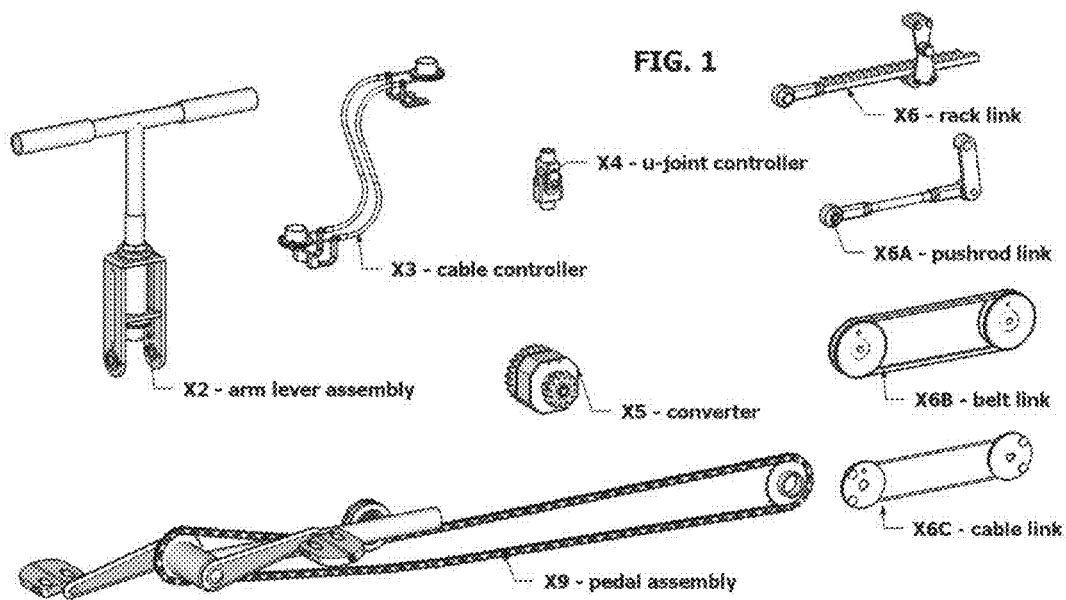
FIG. 1 is an isometric view referencing various components utilized in the invention.

Referring now to FIG. 1; illustrated is an isometric view of multiple components that are claimed and numbered, starting with an "(X)". There is shown an arm lever assembly (X2), a cable controller (X3), a u-joint controller (X4), a converter (X5), a rack link (X6), a pushrod link (X6A), a belt link (X6B), a cable link (X6C), and a pedal assembly (X9).

Referring now to FIG. 2; illustrated is an isometric view of the arm lever assembly (X2) exploded wherein the upper section (22) is "T" shaped with a male shape portion (22a) about the O.D. The arm lever (21) has a female shape portion (21a) on the I.D. that correspondingly slip fits around the O.D. of the male shape portion (22a) allowing the upper section (22) to be adjusted telescopically while maintaining rotational unity.

The reciprocating member (24) is fitted with the bearings (25) at the fulcrum point. The lower bearing (29) is fitted into the bottom end of the reciprocating member (24) and the upper bearing (28), having a lock collar, is fitted into the top of the reciprocating member (24). The arm lever (21) is rotationally supported by both the lower bearing (29) and the upper bearing (28) further being held in place by the lock collar of the upper bearing (28). The slot (26) provides an adjustable connecting area for the either the rack link (X6) or the pushrod link (X6A).

Referring now to FIG. 2A; illustrated is an isometric view illustrating the corresponding rotational movements of the u-joint controller (X4) and the arm lever assembly (X2) when the arm lever assembly (X2) is rotated left or right Referring now to FIG. 2B; illustrated is an isometric view illustrating the reciprocating movement of the arm lever assembly (X2) pivoting about the fulcrum point.

Referring now to FIG. 2C; illustrated is an isometric view illustrating the telescoping movement of the upper section (22) of the arm lever assembly (X2).

Referring now to FIG. 3; illustrated is an isometric view illustrating the method of support of the cable controller (X3) by the arm lever assembly (X2) wherein the rotary member (33) is attached around the O.D. of the arm lever (21) and supports one barrel end (34b) of each cable (34). One end, of each the cable housings (34a) is adjustably supported by the cable tension adjuster (32) that is threaded into a corresponding hole in the cable retainer (31). The opposite ends of the cable housings (34b) are supported by the mountable cable retainer (35) that can be attached to either the pivot support (103) or any other desired location. The rotary receiver (36) supports the opposite ends of the cables (34) and can be fitted to the pitman arm (105) on the arm lever assembly (X2) or any other desired location.

The cable retainer (31) is attached to the reciprocating member (24). When the arm lever (21) is rotated left or right it correspondingly rotates the rotary member (33), pulling on one of the cables, (34) correspondingly rotating the rotary receiver (36).

Figure 4:
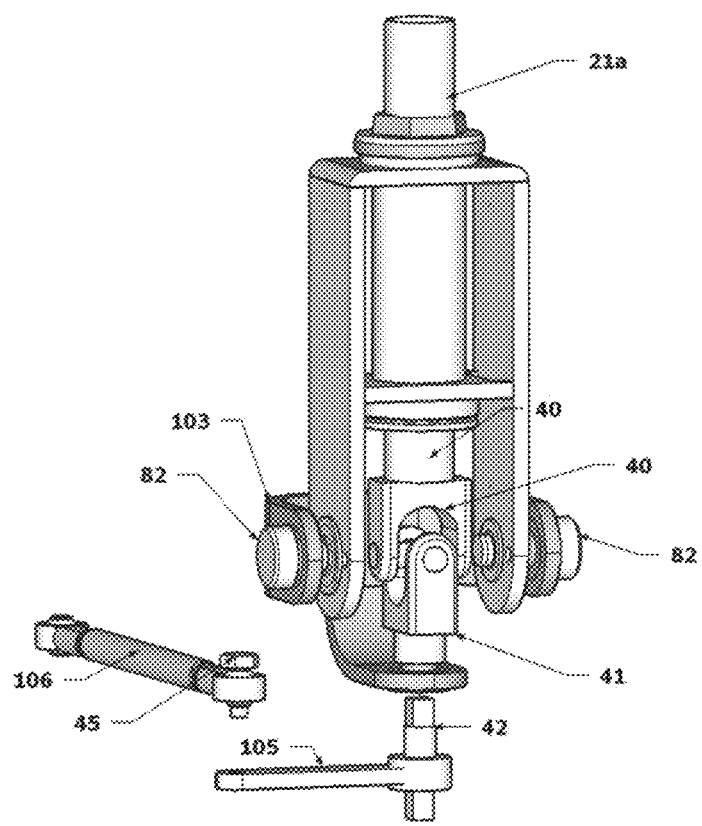
FIG. 4 is an isometric view of the u-joint controller (X4).

Referring now to FIG. 4; there is illustrated the u-joint controller (X4) supported by the reciprocating member (24). The upper half (40) of the universal joint is attached to the bottom of the lower section (21a). The stub shaft (42) is pivotally supported through the bottom of the pivot support (103) and rotationally connecting the lower half (41) and the pitman arm (105). The tie rod (106), having a pivot joint at each end, is attached, by one end, to the pitman arm (105) by the fastener (45) and attached, by the opposite end, to a function of the support mechanism in need of control.

Referring now to FIG. 4A; there is illustrated the ability of the arm lever assembly (X2) and the pivot support (103) to support both the cable controller (X3) and the u-joint controller (X4) at the same time. The stub shaft (42) is pivotally supported through the bottom of the pivot support (103) and rotationally connecting the lower half (41) to the rotary member (33). The cable retainer (31) is attached to the pivot support (103) and the mountable cable retainer (35) and the rotary receiver (36) are operatively supported by the support mechanism.

Figure 5:
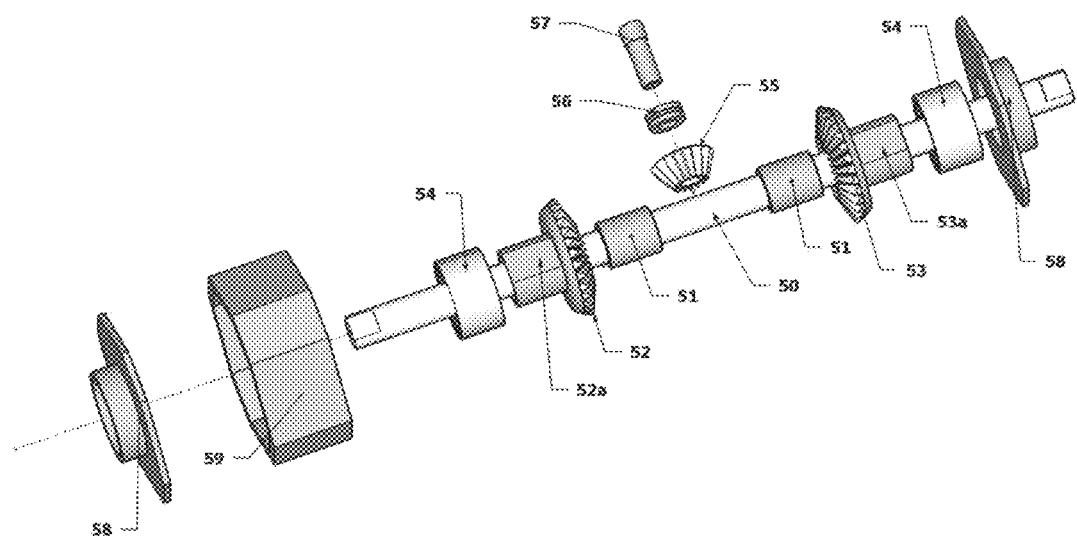
FIG. 5 is isometric view of the converter (X5) exploded.

Referring now to FIG. 5 of the converter (X5) exploded. The common shaft (50) is shown lengthened for further explanation of the components and how the rotational engagement of the clutches (51) in each of the outer gears (52 & 53) can determine whether the common shaft (50), having "D" cuts on both ends, is utilized as either an input end or an output end.

Wherein; each of the outer gears (52 & 53) has an extended hub (52a & 53a) with a "D" cut on the O.D. that axially supports at least one bearing (54) capable of both radial and thrust loads. Further each of the outer gears (52 & 53) has a bored center that is operatively fitted with at least one clutch (51) and axially supported by the common shaft (50). There is at least one idler gear (55) backed by a thrust bearing (56), and axially supported by the stub shaft, (57) arranged right angle of the outer gears (52 & 53) and properly intermeshed between them. The stub shaft (57) is attached to the inside of the middle housing section (59) and each of the housing end caps (58) is axially supported on the O.D. of opposite bearings (54).

Wherein the common shaft (50) is utilized as the input end, the clutch (51), operatively fitted into each of the outer gears (52 & 53) must engage in opposite rotations of the . common shaft (50), and at least one of the extended hubs (52a & 53a) must be utilized as the output end. In this arrangement the common shaft (50) receives reciprocating movements from arm lever assembly (X2) wherein; forward rotational direction of the common shaft (50) engages one of the outer gears (52 & 53) and the reverse rotation of the common shaft (50) engages the opposite of the outer gears (52 & 53), further, because they are intermeshed by the idler gear (55) they both maintain an opposite unidirectional rotation.

Wherein the common shaft (50) is alternatively utilized as the output end, the clutch (51) operatively fitted into each of the outer gears (52 & 53) must be arranged to engage the common shaft (50) in the same rotational direction. In this arrangement at least one of the outer gears (52 & 53) receives reciprocating movements from the arm lever assembly (X2), and because they are intermeshed by the idler gear (55) each of the outer gears (52 & 53) takes turns engaging the common shaft (50) in unidirectional rotation.

Referring now to FIG. 6 of the rack link (X6) exploded. The length of rack gear (62) has a pivot joint (61) fastened at one end that pivotally connects to the reciprocating member (24). The input gear (69a) is axially attached to the input end of the converter (X5) and the two guides (65) maintain proper contact between rack gear (62) and the input gear (69a) during reciprocation.

The upper guide support (63) is fastened to the converter (X5) by the fasteners (68a), the lower guide support (64) is fitted with the bearing (67) and is pivotally supported axially by the pivot pin (69) that is attached to upper guide support (63).

The two guides (65) are rotationally supported on the pins (66) and retained in position by the pin clips (66a). The pivot pin (69) is located at the same axis point as the common shaft (50).

Referring now to FIG. 6A of the pushrod link (X6A). The length of rod (62a) has a pivot joint (61a) on one end that pivotally connects to the reciprocating member (24). The pivot joint (63a), on the opposite end of the rod (62a), is fastened to the corresponding hole in the lever (64a) and the "D" bore (67a) is axially attached to the corresponding cut on the input end.

Referring now to FIG. 6B of the belt link (X6B).

The belt link comprises: two pulleys wherein, the bore (65b) in the pulley (61b) is axially supported by pivot pin (82) of the pivot support (103) and the hole (66b) fastens to the slot (26) in the reciprocating member (24). Pulley (62b), having a "D" bore (64b), is axially attached to the corresponding cut on the input end. The two pulleys (61b) and (62b) are operatively linked by the belt (63b).

Referring now to FIG. 6C of the cable link (X6C).

The cable link comprises: two cable wheels wherein, the bore (65c) in cable wheel (61c) is axially supported by pivot pin (82) of the pivot support (103) and hole (66c) fastens to the slot (26) in the reciprocating member (24). Cable wheel (62c), having a "D" bore (64c), is axially fitted to the corresponding cut on the input end. The two cable wheels (61b) and (62b) are operatively linked by the two cables (63c) as shown.

Referring now to FIG. 8 of the pivot support (103) exploded. Wherein the pivot support (103) pivotally supports the arm lever assembly (X2) by the pivot pins (82). Each of the pivot pins (82) has two sections wherein; threaded section (82a) is larger in diameter and threads into the threaded holes (83), and the bearing section (82b) support the bearings (25) of the arm lever assembly (X2). The bearing (84) is fitted into the corresponding hole in the pivot support (103) and pivotally supports the stub shaft of the pitman arm (105). The fasteners (86) are inserted through the fasten points (85) to attach the middle housing section (59) to the pivot support (103) when the arm lever assembly is connected directly to the converter (X5).

Referring now to FIG. 9 of the pedal assembly (X9) exploded. The axle (92) is rotationally supported by the axle bearings (93) that are fitted into each end of the bottom bracket (91). The crank arm (96) rotationally supports a pedal (99) and the crank arm (97), fitted with the sprocket (97a), also rotationally supports a pedal (99), further, both the crank arm (96) and crank arm (97) are connected to opposite ends of the axle (92). The extension (91A) is attached, by one end, to the bottom bracket (91) and attached, by the opposite end, to the support mechanism forward of the operator. The chain guide (95) is attached along the extension between the support mechanism and the bottom bracket (91). The chain (94) links the sprocket (97a) to the free-wheel sprocket (98) that fixes to the output end of the converter (X5).

Referring now to FIG. 9A, in this arrangement of components the arm lever assembly (X2) is connected directly to the converter (X5) and the cable controller (X3) is utilized as the controller.

Referring now to FIG. 9B, the extended hub (53a) is the output end and axially supports the output wheel (111) that is retained in position by the setscrew (H25). The common shaft (50) is the input end and has a shape on the O.D., on both ends, that corresponds with a shape on the I.D. of the adaptors (H20). The adaptors (H20) are fitted into the reciprocating member at the fulcrum point. The bolts (H21) slip through the hole H21a) in each of the adaptors (H20) and thread into the threaded holes (H21b) on both sides of the reciprocating member (24) holding the adaptor (H20) in place. The output wheel (111) has a "D" cut on the I.D. that corresponds with the "D" cut on the O.D. of the extended hub (53a) and retained in place by the setscrew (H25). The converter (X5) is shown utilizing a sprocket as the output wheel (111), when a pulley or a spur gear could also be utilized.

Referring now to FIG. 9C, in this arrangement of components the arm lever assembly (X2) is fitted with the bearings (25) at the fulcrum point and pivotally supported by the pivot support (103). The u-joint controller (X4) is utilized by the arm lever assembly X2 and pivotally supported by the pivot support (103). The converter (X5) is supported by the frame ((100) not shown) a distance from the arm lever assembly (X2) and the rack link (X6) is linking the arm lever assembly (X2) to the converter (X5). The pitman arm (105) is pivotally supported by the pivot support (103) and connected directly to the u-joint controller (X4).

Referring now to FIG. 9D, in this arrangement of components the arm lever assembly (X2) is fitted with the bearings (25) at the fulcrum point and pivotally supported by the pivot support (103); the cable controller (X3) is utilized by the arm lever assembly (X2) and the converter (X5) is supported by the frame ((100) not shown) a distance from the arm lever assembly (X2). The pushrod link (X6A) is linking the arm lever assembly (X2) to the converter (X5).

Referring now to FIG. 9E, in this arrangement of components the arm lever assembly (X2) is fitted with the bearings (25) at the fulcrum point and pivotally supported by the pivot support (103). The cable controller (X3) is utilized by the arm lever assembly (X2) and the converter (X5) is supported by the frame ((100) not shown) a distance from the arm lever assembly (X2). The belt link (X6B) is linking the arm lever assembly (X2) to the converter (X5).

Referring now to FIG. 9F, in this arrangement of components the arm lever assembly (X2) is fitted with the bearings (25) at the fulcrum point and pivotally supported by the pivot support (103). The cable controller (X3) and the u-joint controller (X4) are both being utilized by the arm lever assembly (X2) wherein, the lower half (41) of the u-joint controller (X4) is connected directly to the pitman arm (105) that is pivotally supported by the pivot support (103). The converter (X5) is supported by the frame ((100) not shown) a distance from the arm lever assembly (X2) and the cable link (X6C) is linking the arm lever assembly (X2) to the converter (X5).

Figure 10C:
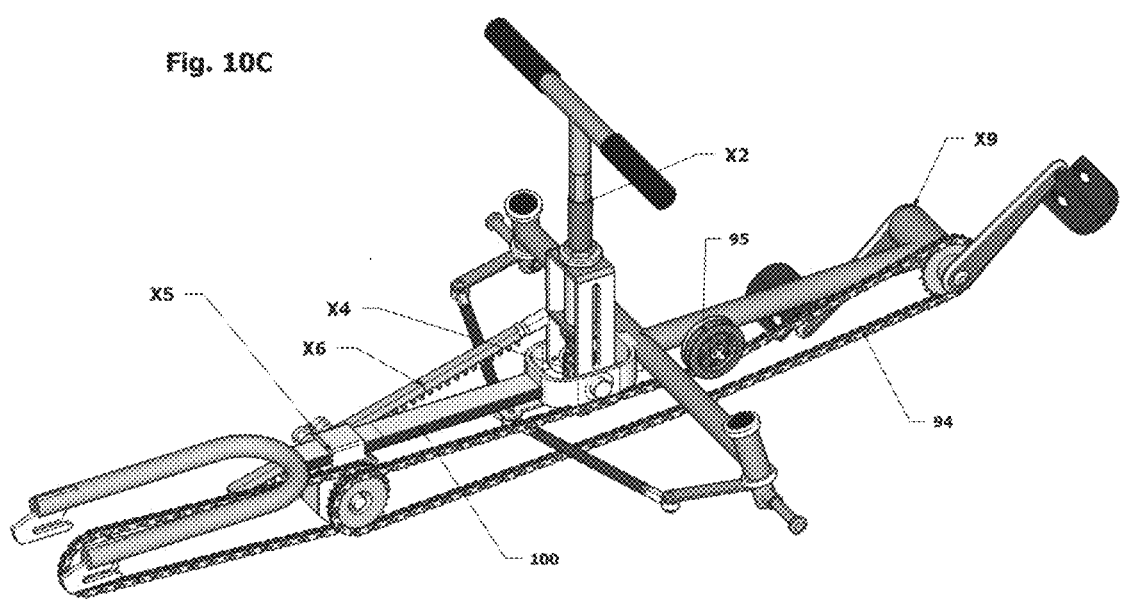
FIG. 10C is an isometric view of the reverse trike support utilizing the arm lever assembly (X2) linked to the converter (X5) with the rack link (X6) and the pedal assembly (X9).
Figure 10D:
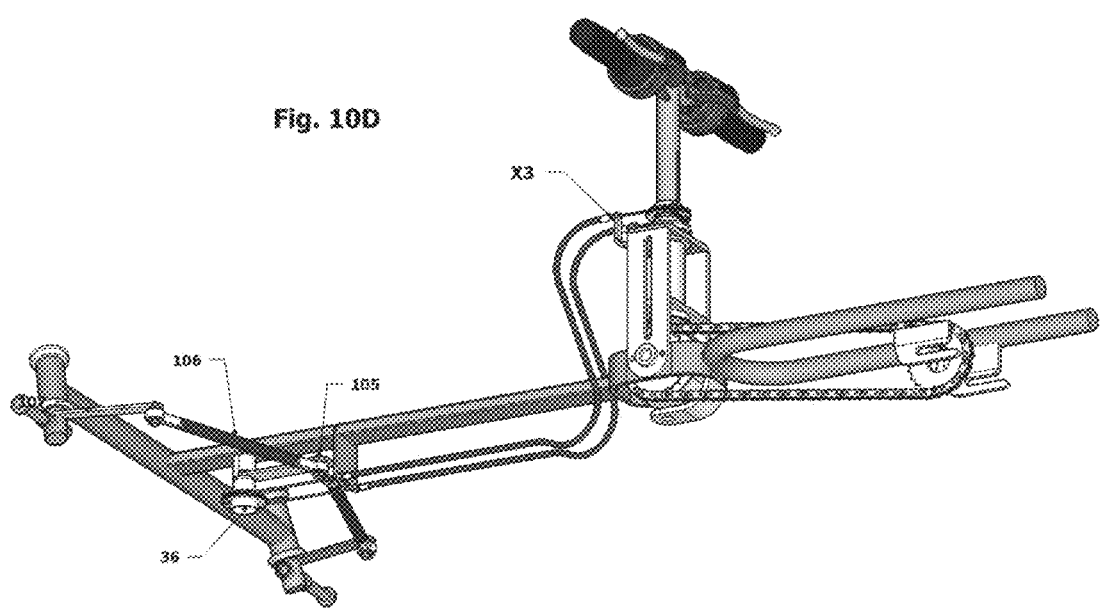
FIG. 10 is an isometric view of the reverse trike partially exploded.
FIG. 10A is an isometric view of the trike support partially exploded.
FIG. 10B is an isometric view of the reverse trike support utilizing the arm lever assembly (X2) connected directly to the converter (X5) and the pedal assembly (X9).

Referring now to FIG. 10 of the reverse trike support. This version utilizes the leg support (112) that is configured to support the operator's legs in a resting manner while sitting in the seat (104). The steerable wheels (114) are rotationally supported by the axles (109) that are attached to the kingpins (108), further, the kingpins (108) are fitted with steering arms (107) that are pivotally connected to the outer ends of the tie rods (106). The inner ends of the tie rods (106) are pivotally connected to the pitman arm (105) that is pivotally supported by the pivot support (103). The pitman arm (105) is connected to either the lower half (41) of the u-joint controller (X4), the rotary receiver (36) of the cable controller (X3) or both. The kingpins (108) are pivotally supported by the bearings (110) on both ends of the cross member (101). The cross member (101) is attached to the frame (100) forward of the pivot support (103). The fork (102), attached to the frame (100) rear of the seat, (104) rotationally supports the drive wheel (115) allowing it to be adjusted forward or rearward to eliminate unwanted slack in the chain (118) that links the drive wheel (115) to the output wheel (111).

Referring now to FIG. 10A of the trike support. This version utilizes two leg supports (112) that are configured to support the operator's legs while sitting in the seat (104). The steerable wheels (114) are rotationally supported by the axles (109) attached to the kingpins (108), further, the kingpins (108) are fitted with steering arms (107) that are pivotally connected to the outer ends of the tie rods (106). The inner ends of the tie rods (106) are pivotally connected to the pitman arm (105) that is pivotally supported by the frame (100). The kingpins (108) are pivotally supported by the bearings (110) on both ends of the cross member (101). The cross member (101) is attached to the frame (100) rear of the seat (104). The pivot support (103), attached to the frame (100) forwards of the seat (104), pivotally supports the arm lever assembly (X2) connected directly to the common shaft (50) of the converter (X5). The rotary receiver (36) is axially connected to the pivot point of the pitman arm (105) and the mountable cable retainer (35) is mounted on the frame (100) forward of the pitman arm (105). The fork (102) attached to the frame (100) forward of the seat (104) rotationally supports the drive wheel (115) allowing it to be adjusted forward or rearward to eliminate unwanted slack in the chain (118) that links the drive wheel (115) to the output wheel (111) of the converter (X5).

Referring now to FIG. 10B of the reverse trike support and its abilities to support the various components of the human-propulsion-system wherein the arm lever assembly (X2), utilizing the cable controller (X3), is connected directly to the converter (X5). The pedal assembly (X9) is attached to the cross member (101) and linked to the converter (X5). There are two chain guides (95) used wherein the rear chain guide (95) is used to guide the chain (118) from rubbing on the fork (102) and the front chain guide (95) has an up and down adjustment that allows it to guide and eliminate unwanted slack in the chain (94).

Referring now to FIG. 10C of the reverse trike support which illustrates another example of its abilities to support the various components of the human-propulsion- system wherein; the arm lever assembly (X2), utilizing the u-joint controller (X4), is linked to the converter (X5) with the rack link (X6). The converter (X5) can be adjusted along the frame (100) to eliminate unwanted slack in the chain (94).

Referring now to FIG. 11, there is illustrated the wheelchair support wherein: the propulsion wheels (130) are fitted with the clutch bearings (131) and rotationally supported on each end of the axle (124) and held in place by the quick release pins (125). The axle supports (133), being part of the frame (100), are fitted with the axle bearings (123); the axle bearings (123) rotationally support the axle (124) near each end. The caster-wheel assemblies (135) are pivotally supported by the frame (100) and fitted with the steering aims (126). The tie rods (106) are pivotally connected by one end to the steering arms (126) and pivotally connected to the pitman arm (105) by the opposite ends, further, the pitman arm (105) is pivotally attached to the pivot support (103). The pivot support (103) is attached to the front cross member (100a), that is part of the frame (100), and the support post (127) is attached to the rear cross member (100b) that is also part of the frame (100). The seat (104) is attached to top of the frame (100).

Referring now to FIG. 11A, there is only various parts of the wheelchair support shown to illustrate how the human-propulsion-system is supported when the arm lever assembly (X2) and the converter (X5) are separated.

The arm lever assembly (X2) is pivotally supported by the pivot pins (82) of the pivot support (103) and the converter (X5) is attached to the slide bracket (122) and linked to the arm lever assembly (X2) by the rack link (X6) (but can also be linked with the pushrod link (X6A), the belt link (X6B), or the cable link (X6C)). The slide activator (128) passes through the part of the frame (100) behind the pivot support (103) and is attached to the slide bracket (122). When the locking tab (129) is slid upward the slide activator (128) can be pulled forward which pulls the slide bracket (122) forward disengaging the output wheel (111), which is a spur gear, from the second output wheel (136), which is also a spur gear. This allows the wheelchair support to be manually moved in reverse. When the slide activator (128) is pushed rearward it pushes the slide bracket (122) rearward and engages the output wheel (111) with the second output wheel (136) and then the locking tab (129) is slid downward locking the slide activator (128) rearward allowing the reciprocal movements of the arm lever assembly (X2) to propel the wheelchair support forward. Further, the u-joint controller (X4) is utilized and connected directly to the pitman arm (105), although the cable controller (X3) can also be utilized.

Referring now to FIG. 11B, there is only various parts of the wheelchair support shown to illustrate how the human-propulsion-system is supported when the arm lever assembly (X2) is connected directly to the converter (X5). The output wheel (111) is a pulley linked to the second output wheel (136), also a pulley, by the belt (137). Tension is maintained and relaxed on the belt (137) by a belt tensioner (120). The belt tensioner (120) is an armature wherein one end supports a roller that makes contact with the outer backside of the belt (137) and the opposite end is pivotally attached to the support post (127). Further the belt tensioner (120) utilizes a tension spring (121) that tenses when the spring pin (121a) is moved rearward.

The arm, lever assembly (X2) is connected directly to the common shaft (50) of the converter (X5). The converter (X5) is attached to the backside of the pivot support (103) and the output wheel (111) is linked to the second output wheel (136) by the belt (137). The slide activator (128) passes through the part of the frame (100) behind the pivot support (103) and is attached to the slide bracket (122). When the locking tab (129) is slid upward the slide activator (128) can be pulled forward which pulls the slide bracket (122) forward. This relaxes the tension between the tension spring (121) and the spring pin (121a) allowing the belt tensioner (120) to relax; allowing the tension of the belt (137) to relax; allowing the second output wheel (136) to slip freely from the belt (137); allowing the wheelchair support to be manually moved in reverse. When the slide activator is pushed rearward, it pushes the slide bracket (122) rearward, causing the spring pin (121a) to put tension on the tension spring (121), putting tension on the belt tensioner (120) and preventing the second output wheel (136) from slipping against the belt (137) thus allowing the reciprocal movements of the arm lever assembly (X2) to propel the wheelchair support forward. Further the cable controller (X3) is connected directly to the pitman arm (105).

The invention I claim is:

1. A human-propulsion-system configured to be utilized on a support mechanism, the support mechanism comprising at least a frame, a seat supported by the frame and capable of supporting an operator thereon, at least one operator-engaging member operably attached to the frame forward of the seat and capable of being engaged by the operator, a pitman arm pivotally supported by the frame, and at least one tie rod pivotally connecting the pitman arm to a direction-controlling assembly movably supported by the support mechanism, the human-propulsion-system comprising:

an arm lever assembly comprising an arm lever configured to be reciprocated in a fore-and-aft direction by at least one arm of the operator to provide propulsion to the support mechanism, the arm lever further configured to be rotated in left and right directions by at least one arm of the operator to provide directional control of the support mechanism, the arm lever assembly further comprising a reciprocating member configured to be pivotally supported by the support mechanism, the reciprocating member rotatably supporting the arm lever to be rotated in the left and right directions and defining a pivot axis about which the arm lever is operable to pivot relative to the support mechanism while being reciprocated in the fore-and-aft direction;

a converter configured to be supported by the support mechanism, the converter comprising a housing, an input element, an output element, a common shaft extending through the housing, at least a portion of the common shaft being disposed outside of the housing, two bevel gears disposed within the housing and coaxially supported by the common shaft, each bevel gear having a bored center operably fitted with at least one clutch, and at least one idler gear intermeshed between the two bevel gears, wherein the input element of the converter is configured to operably receive reciprocating movement transferred from the arm lever in the fore-and-aft direction such that the converter converts the reciprocating movement into a unidirectional rotation which is outputted at the output element of the converter to operably cause the support mechanism to be propelled; and a controller operably linking the arm lever of the arm lever assembly to the pitman arm of the support mechanism to transfer rotational movement of the arm lever to the pitman arm such that rotational movement of the arm lever in the left and right directions operably causes the pitman arm to pivot and operably moves the at least one tie rod and the direction-controlling assembly to provide the directional control of the support mechanism.

2. The human-propulsion-system as defined in claim 1, wherein the at least one operator-engaging member of the support mechanism comprises leg supports configured to support legs of the operator in a resting manner.

3. The human-propulsion-system as defined in claim 1, wherein the at least one operator-engaging member of the support mechanism comprises a pedal assembly configured to engage with and be rotated by feet of the operator, the pedal assembly comprising an extension having a first end attached to the support mechanism and a second end rotatably supporting a set of cranks, the set of cranks being operably connected to respective pedals and at least one sprocket, the pedal assembly further comprising a free-wheel sprocket rotationally linked to the at least one sprocket and operably coupled to the output element of the converter, wherein the operator pedaling the set of cranks via the pedals operably causes rotation of the at least one sprocket and the free-wheel sprocket.

4. The human-propulsion-system as defined in claim 1, wherein the arm lever of the arm lever assembly comprises an upper male section and a lower female section configured to slidably receive and positively engage with the upper male section in such a manner that the upper male section is capable of telescoping freely within the lower female section while positively transmitting rotational movement to the lower female section to enable the upper male section and the lower female section to rotate together unitarily.

5. The human-propulsion-system as defined in claim 1, wherein the input element of the converter is connected directly to the reciprocating member of the arm lever assembly at the pivot axis such that reciprocating the arm lever in the fore-and-aft direction causes the input element of the converter to rotate forward and backward, wherein the arm lever assembly and the converter are both supported by the support mechanism forward of the seat, and wherein the controller is a cable controller comprising a rotary member operably coupled about an outer diameter of the arm lever, a rotary receiver operably attached to the pitman arm of the support mechanism, and at least two adjustable cables operably linking the rotary member to the rotary receiver.

6. The human-propulsion-system as defined in claim 1, wherein the human-propulsion-system further comprises:
   at least two bearings supported by the reciprocating member of the arm lever assembly at the pivot axis, the at least two bearings configured to be pivotally supported by the support mechanism;
   a rack link assembly operably linking the reciprocating member of the arm lever assembly to the input element of the converter to transfer the reciprocating movement of the arm lever in the fore-and-aft direction to the converter; and
   wherein the controller is a cable controller comprising a rotary member operably coupled about an outer diameter of the arm lever, a rotary receiver operably attached to the pitman arm of the support mechanism, and at least two adjustable cables operably linking the rotary member to the rotary receiver.

7. The human-propulsion-system as defined in claim 1, wherein the human-propulsion-system further comprises:
   at least two bearings supported by the reciprocating member of the arm lever assembly at the pivot axis, the at least two bearings configured to be pivotally supported by the support mechanism;
   a rack link assembly operably linking the reciprocating member of the arm lever assembly to the input element of the converter to transfer the reciprocating movement of the arm lever in the fore-and-aft direction to the converter; and
   wherein the controller is a U-joint controller comprising a universal joint having a first portion operably coupled to the arm lever and a second portion operably coupled to the pitman arm of the support mechanism.

8. The human-propulsion-system as defined in claim 1, wherein the human-propulsion-system further comprises:
   at least two bearings supported by the reciprocating member of the arm lever assembly at the pivot axis, the at least two bearings configured to be pivotally supported by the support mechanism;
   a pushrod link assembly operably linking the reciprocating member of the arm lever assembly to the input element of the converter to transfer the reciprocating movement of the arm lever in the fore-and-aft direction to the converter; and
   wherein the controller is a cable controller comprising a rotary member operably coupled about an outer diameter of the arm lever, a rotary receiver operably attached to the pitman arm of the support mechanism, and at least two adjustable cables operably linking the rotary member to the rotary receiver.

9. The human-propulsion-system as defined in claim 1, wherein the human-propulsion-system further comprises:
   at least two bearings supported by the reciprocating member of the arm lever assembly at the pivot axis, the at least two bearings configured to be pivotally supported by the support mechanism;
   a pushrod link assembly operably linking the reciprocating member of the arm lever assembly to the input element of the converter to transfer the reciprocating movement of the arm lever in the fore-and-aft direction to the converter; and
   wherein the controller is a U-joint controller comprising a universal joint having a first portion operably coupled to the arm lever and a second portion operably coupled to the pitman arm of the support mechanism.

10. The human-propulsion-system as defined in claim 1, wherein the human-propulsion-system further comprises:
    at least two bearings supported by the reciprocating member of the arm lever assembly at the pivot axis, the at least two bearings configured to be pivotally supported by the support mechanism;
    a cable link assembly operably linking the reciprocating member of the arm lever assembly to the input element of the converter to transfer the reciprocating movement of the arm lever in the fore-and-aft direction to the converter; and
    wherein the controller is a cable controller comprising a rotary member operably coupled about an outer diameter of the arm lever, a rotary receiver operably attached to the pitman arm of the support mechanism, and at least two adjustable cables operably linking the rotary member to the rotary receiver.

11. The human-propulsion-system as defined in claim 1, wherein the human-propulsion-system further comprises:
    at least two bearings supported by the reciprocating member of the arm lever assembly at the pivot axis, the at least two bearings configured to be pivotally supported by the support mechanism;
    a cable link assembly operably linking the reciprocating member of the arm lever assembly to the input element of the converter to transfer the reciprocating movement of the arm lever in the fore-and-aft direction to the converter; and
    wherein the controller is a U-joint controller comprising a universal joint having a first portion operably coupled to the arm lever and a second portion operably coupled to the pitman arm of the support mechanism.

12. The human-propulsion-system as defined in claim 1, wherein the human-propulsion-system further comprises:
    at least two bearings supported by the reciprocating member of the arm lever assembly at the pivot axis, the at least two bearings configured to be pivotally supported by the support mechanism;
    a belt link assembly operably linking the reciprocating member of the arm lever assembly to the input element of the converter to transfer the reciprocating movement of the arm lever in the fore-and-aft direction to the converter; and
    wherein the controller is a cable controller comprising a rotary member operably coupled about an outer diameter of the arm lever, a rotary receiver operably attached to the pitman arm of the support mechanism, and at least two adjustable cables operably linking the rotary member to the rotary receiver.

13. The human-propulsion-system as defined in claim 1, wherein the human-propulsion-system further comprises:
    at least two bearings supported by the reciprocating member of the arm lever assembly at the pivot axis, the at least two bearings configured to be pivotally supported by the support mechanism;
    a belt link assembly operably linking the reciprocating member of the arm lever assembly to the input element of the converter to transfer the reciprocating movement of the arm lever in the fore-and-aft direction to the converter; and
    wherein the controller is a U-joint controller comprising a universal joint having a first portion operably coupled to the arm lever and a second portion operably coupled to the pitman arm of the support mechanism.

14. The human-propulsion-system as defined in claim 1, wherein the support mechanism is a trike and further comprises a drive wheel operably linked to the output element of the converter to propel the trike forward, a cross member attached to the frame rearward of the seat, two steerable wheels rotatably supported by the cross member and operably connected with the direction-controlling assembly, the steerable wheels configured to be steered by the rotational movement of the arm lever in the left and right directions, a fork attached to the frame forward of the seat and rotatably supporting the drive wheel, and at least one hand-lever-activated braking system operably connected with at least one of the drive wheel and steerable wheels to enable the operator to slow and stop the trike.

15. The human-propulsion-system as defined in claim 1, wherein the support mechanism is a reverse-trike and further comprises a drive wheel operably linked to the output element of the converter to propel the reverse-trike forward, a cross member attached to the frame forward of the seat, two steerable wheels rotatably supported by the cross member and operably connected with the direction-controlling assembly, the steerable wheels configured to be steered by the rotational movement of the arm lever in the left and right directions, a fork attached to the frame rearward of the seat and rotatably supporting the drive wheel, and at least one hand-lever-activated braking system operably connected with at least one of the drive wheel and steerable wheels to enable the operator to slow and stop the reverse-trike.

16. The human-propulsion-system as defined in claim 1, wherein the support mechanism is a wheelchair and further comprises an axle rotatably supported by the frame, two drive wheels rotatably supported on opposite ends of the axle and operably linked to the output element of the converter, at least one braking system operably connected with the drive wheels to enable the operator to slow and stop the wheelchair, and at least one steerable caster wheel assembly rotatably supported by the frame and operably connected to the direction-controlling assembly, the at least one steerable caster wheel assembly configured to be steered by the rotational movement of the arm lever in the left and right directions.

* * * * *